(12) United States Patent
Godrich et al.

(10) Patent No.: US 9,059,600 B2
(45) Date of Patent: Jun. 16, 2015

(54) CONVERGENT ENERGIZED IT APPARATUS FOR RESIDENTIAL USE

(75) Inventors: Kfir Godrich, Morganville, NJ (US);
William Thayer, Los Gatos, CA (US);
Arne Ballantine, Palo Alto, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 430 days.

(21) Appl. No.: 13/533,456

(22) Filed: Jun. 26, 2012

(65) Prior Publication Data
US 2012/0326653 A1     Dec. 27, 2012

Related U.S. Application Data

(60) Provisional application No. 61/501,610, filed on Jun. 27, 2011.

(51) Int. Cl.
| | | |
|---|---|---|
| H02J 5/00 | (2006.01) | |
| H02J 1/10 | (2006.01) | |
| H02J 3/38 | (2006.01) | |
| H02J 3/14 | (2006.01) | |
| G06F 1/26 | (2006.01) | |

(52) U.S. Cl.
CPC . *H02J 1/10* (2013.01); *H02J 3/387* (2013.01);
*H02J 2003/143* (2013.01); *G06F 1/26* (2013.01)

(58) Field of Classification Search
None
See application file for complete search history.

(56) References Cited

U.S. PATENT DOCUMENTS

| | | | |
|---|---|---|---|
| 6,781,249 B2 | 8/2004 | Holder et al. | |
| 7,250,231 B2 | 7/2007 | Edlund | |
| 7,634,667 B2 * | 12/2009 | Weaver et al. | 713/300 |
| 7,691,502 B2 * | 4/2010 | Wallace et al. | 429/423 |
| 7,705,490 B2 | 4/2010 | Srinivasan et al. | |
| 7,713,649 B2 | 5/2010 | Hickey et al. | |
| 7,880,323 B2 * | 2/2011 | Menges | 290/55 |
| 7,919,953 B2 * | 4/2011 | Porter et al. | 323/222 |
| 8,216,732 B2 * | 7/2012 | Lam | 429/431 |
| 8,434,804 B2 * | 5/2013 | Slessman | 296/24.3 |
| 8,618,456 B2 * | 12/2013 | Hinman et al. | 250/203.4 |
| 8,648,481 B2 * | 2/2014 | Menges | 290/44 |
| 2002/0086194 A1 | 7/2002 | Blaszczyk et al. | |
| 2002/0134098 A1 | 9/2002 | Feeney | |
| 2004/0180253 A1 | 9/2004 | Fisher | |
| 2004/0219415 A1 | 11/2004 | Brignone et al. | |
| 2006/0210841 A1 | 9/2006 | Wallace et al. | |
| 2007/0254193 A1 * | 11/2007 | Lam | 429/12 |
| 2007/0284885 A1 * | 12/2007 | Menges | 290/55 |
| 2009/0072624 A1 * | 3/2009 | Towada | 307/65 |
| 2009/0246566 A1 | 10/2009 | Craft, Jr. et al. | |
| 2010/0043870 A1 * | 2/2010 | Bennett et al. | 136/251 |
| 2010/0085788 A1 | 4/2010 | Zacharias et al. | |
| 2010/0139887 A1 * | 6/2010 | Slessman | 165/67 |
| 2010/0295383 A1 * | 11/2010 | Cummings | 307/151 |

(Continued)

OTHER PUBLICATIONS

Gross et al., "Total DC Integrated Data Centers," no publisher, no date, pp. 125-130.*

(Continued)

*Primary Examiner* — Leigh Garbowski
(74) *Attorney, Agent, or Firm* — The Marbury Law Group PLLC

(57) ABSTRACT

A residential box data center system includes an information technology (IT) load, a direct current (DC) power generator electrically connected to the IT load and a housing, where both the IT load and the DC power generator are located in the housing.

28 Claims, 12 Drawing Sheets

(56) References Cited

U.S. PATENT DOCUMENTS

| | | |
|---|---|---|
| 2011/0061015 A1 | 3/2011 | Drees et al. |
| 2011/0281185 A1 | 11/2011 | Sridhar et al. |
| 2011/0316337 A1* | 12/2011 | Pelio et al. ............ 307/24 |
| 2012/0189940 A1 | 7/2012 | Richards et al. |
| 2012/0327592 A1* | 12/2012 | Godrich et al. ......... 361/679.48 |

OTHER PUBLICATIONS

USPTO, U.S. Appl. No. 13/533,070, Office Action issued Apr. 10, 2015, 23pgs.

* cited by examiner

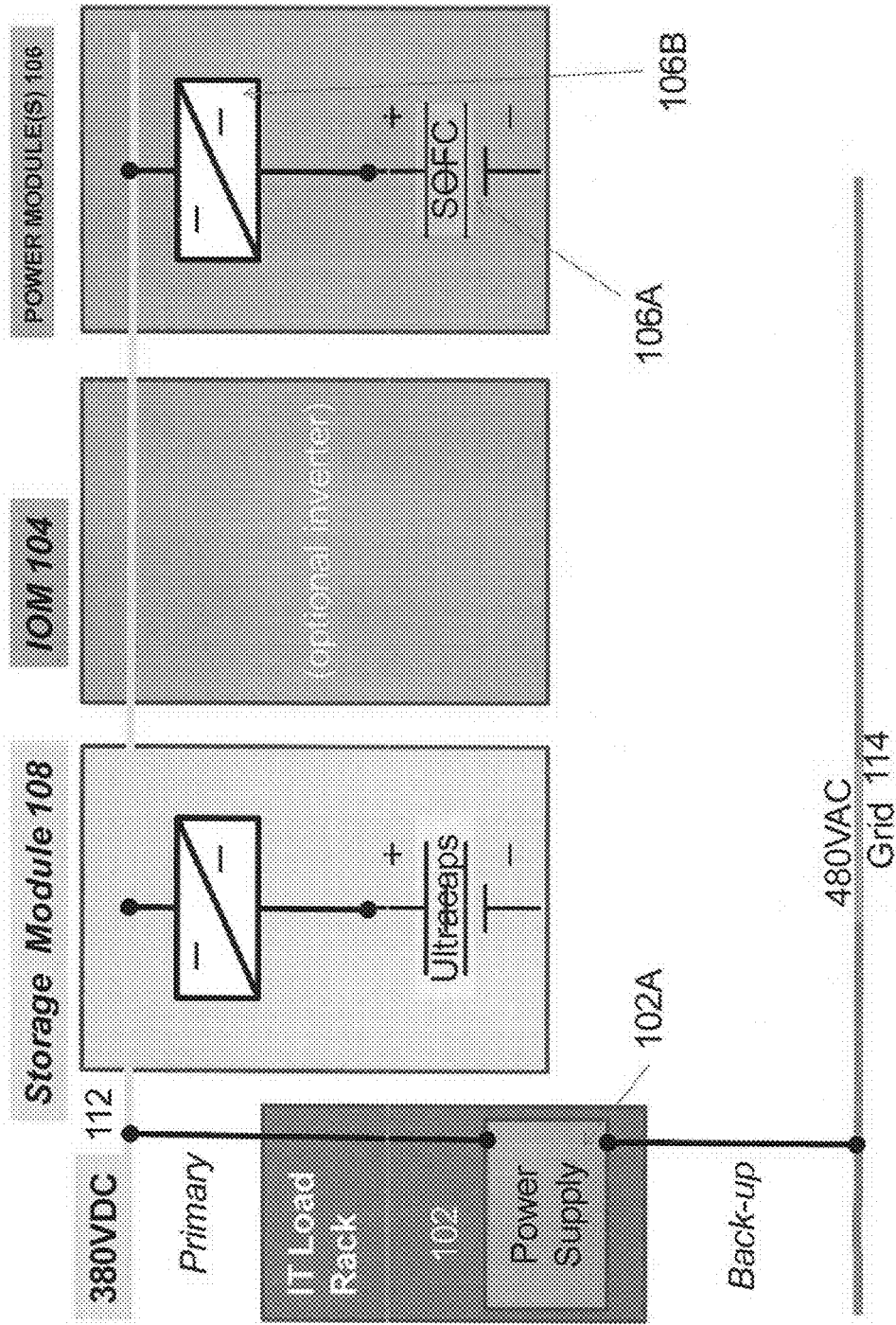
FIGURE 1 - Prior Art

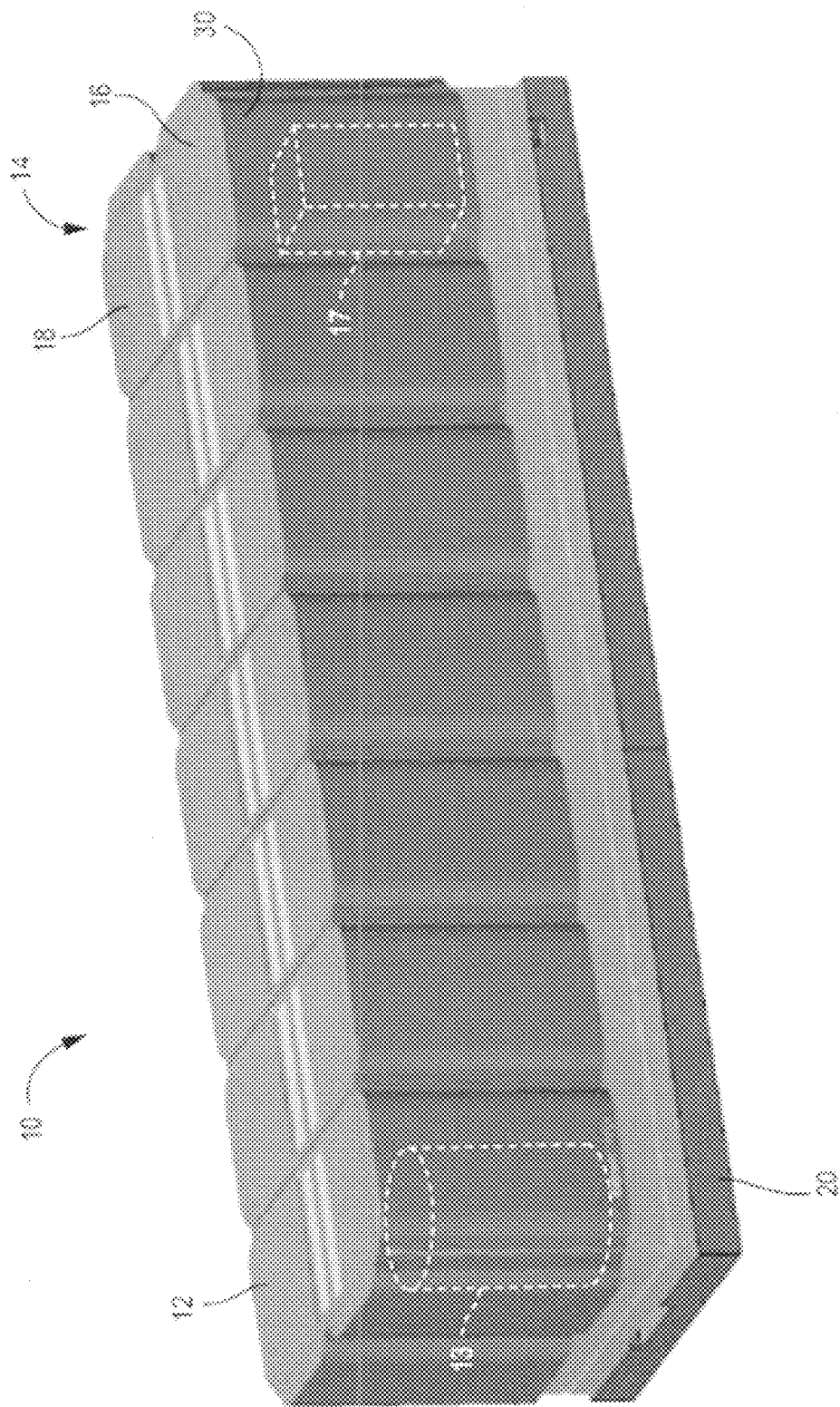
FIG. 2 – Prior Art

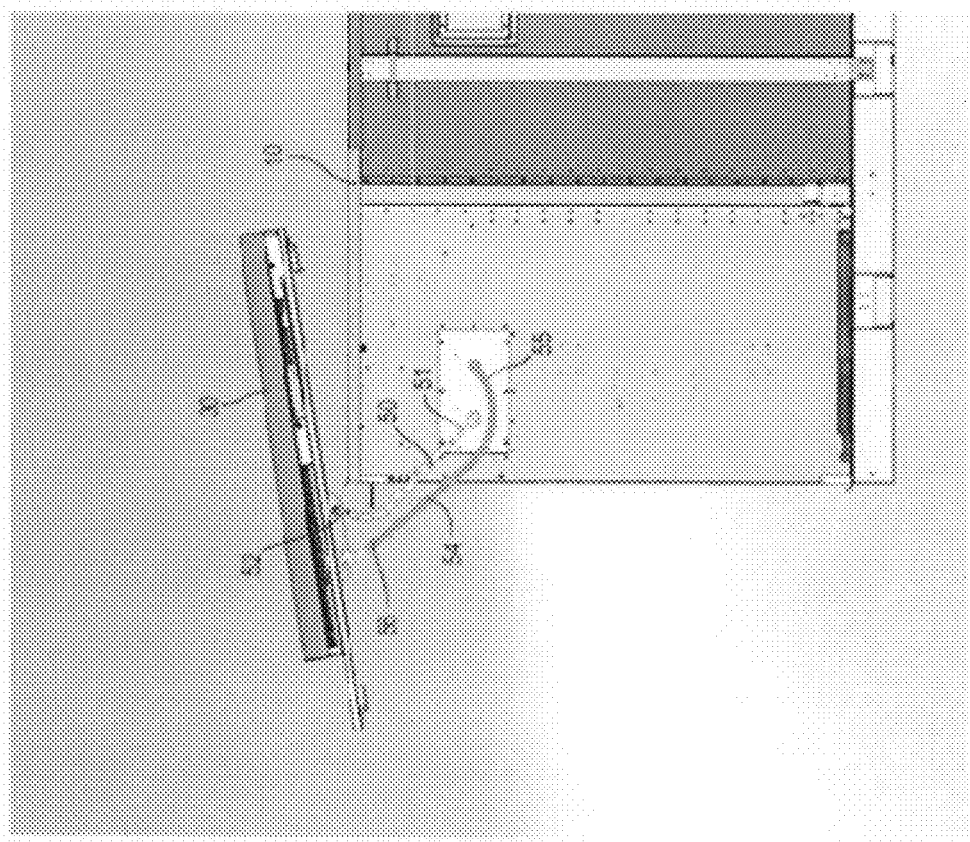
FIG. 3 – Prior Art

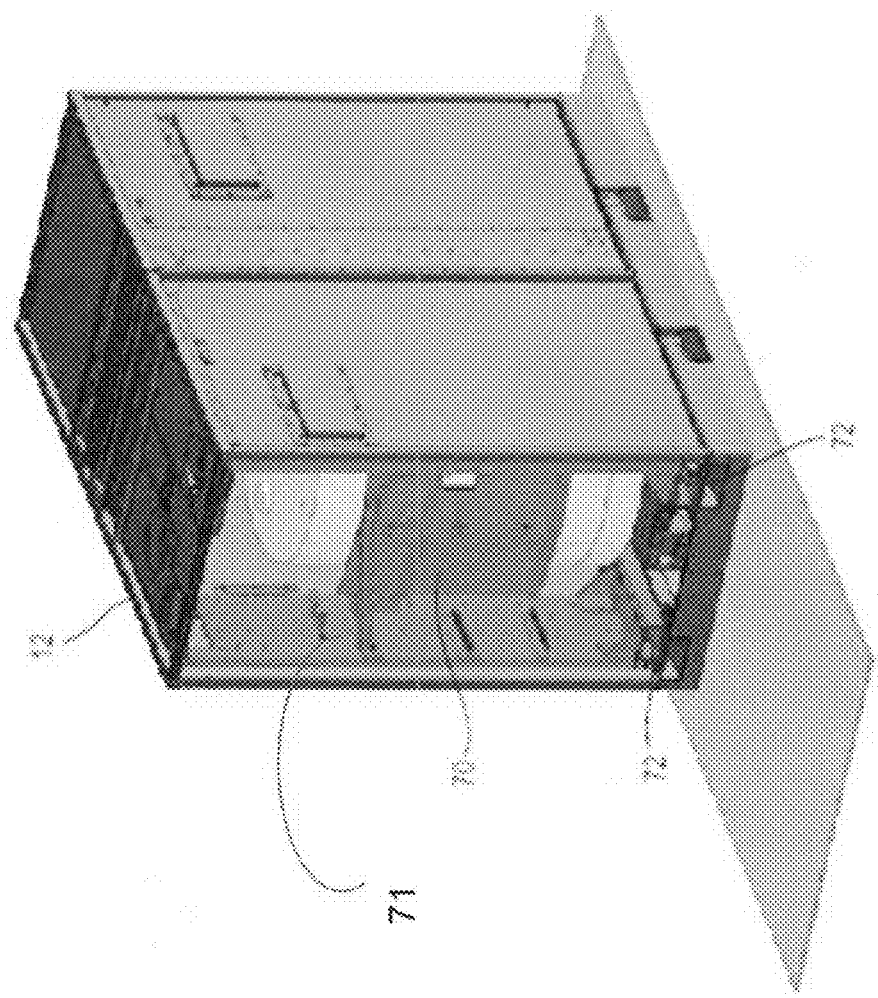
FIG. 4 – Prior Art

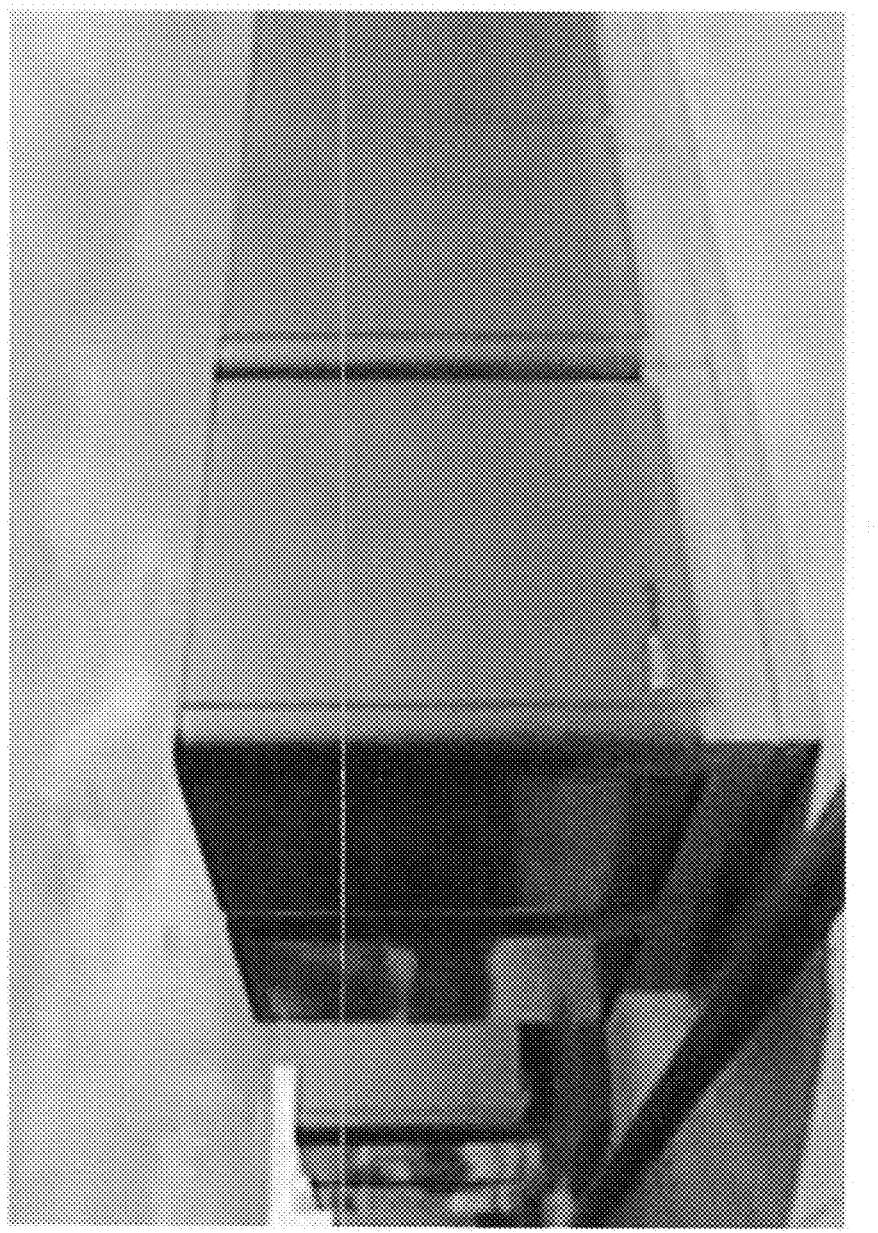
FIG. 5 – Prior Art

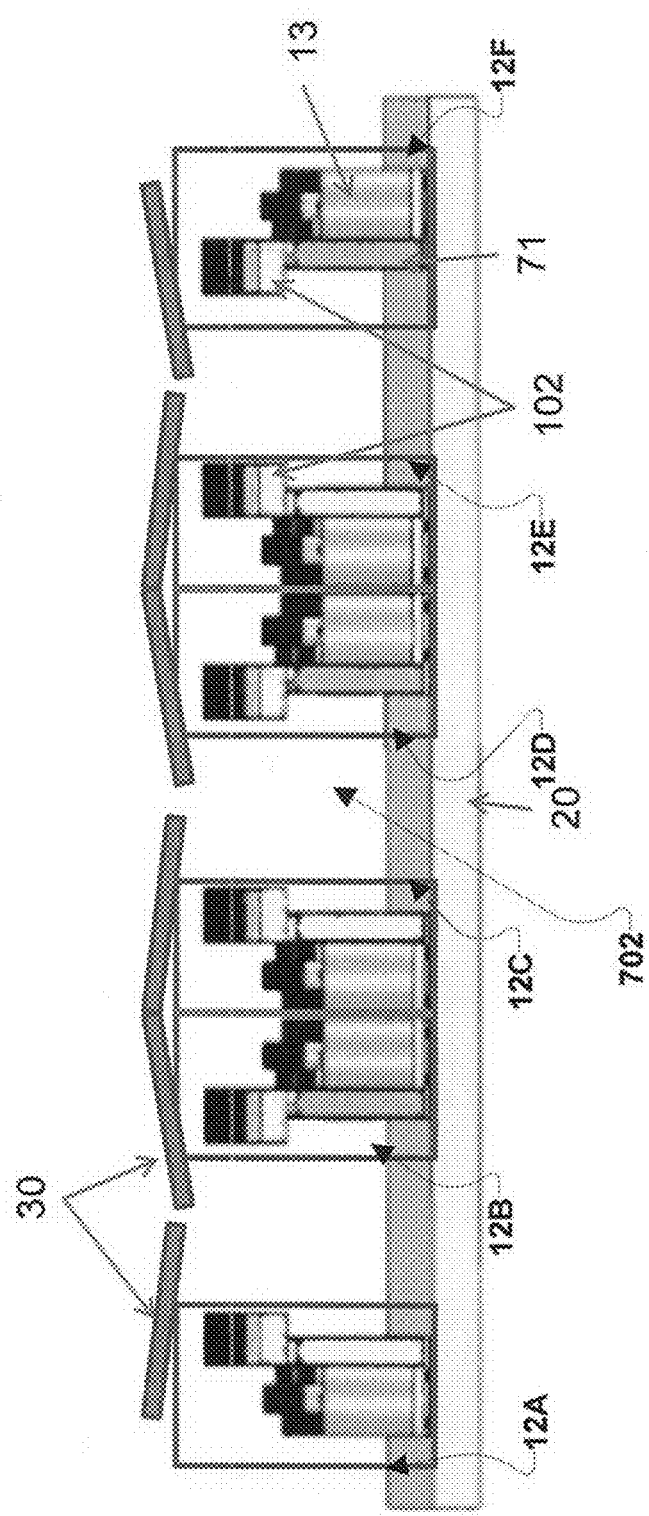

CONVERGENT ENERGIZED IT APPARATUS FOR RESIDENTIAL USE

CROSS-REFERENCE TO RELATED APPLICATION

This application claims the benefit of priority to U.S. Provisional Patent Application Ser. No.: 61/501,610 entitled "Convergent Energized IT Apparatus for Residential Use" filed Jun. 27, 2011, which is incorporated herein by reference in its entirety.

BACKGROUND

Information technology ("IT") loads are often deployed in racks or cabinets that in most markets average nowadays 4-6 KW per rack. Technology is getting denser with racks going over 40 KW per rack and even higher for High Performance Computing applications. Applications in the range of 8-35 KW are becoming more and more popular with blades, heavy storage, and networking being integrated for mobility reasons.

Cloud computing is allowing utilization of more distributed configurations with better utilization of existing data centers, public clouds, and new private clouds created in a way that is allowing optimal operation for enterprises or the small and medium business (SMB) market, for example, by allowing "Everything as a Service" way of utilization for the cloud consumer. "Infrastructure as a Service" models are better synchronized to the requirements of businesses, therefore, there is a need in the market for building blocks for such infrastructure that will allow overall faster time to market at optimal cost.

Referring to FIG. 1, a prior art fuel cell system includes a DC load 102, such as an information technology (IT) load (i.e., devices operating in an IT system which may include one or more of computer(s), server(s), modem(s), router(s), rack(s), power supply connections, and other components found in a data center environment), an input/output module (IOM) 104, and one or more power modules 106.

The IOM 104 may comprise one or more power conditioning components. The power conditioning components may include components for converting DC power to AC power, such as a DC/AC inverter 104A (e.g., a DC/AC inverter described in U.S. Pat. No. 7,705,490, incorporated herein by reference in its entirety), electrical connectors for AC power output to the grid, circuits for managing electrical transients, a system controller (e.g., a computer or dedicated control logic device or circuit), etc. The power conditioning components may be designed to convert DC power from the fuel cell modules to different AC voltages and frequencies. Designs for 208V, 60 Hz; 480V, 60 Hz; 415V, 50 Hz and other common voltages and frequencies may be provided.

Each power module 106 cabinet is configured to house one or more hot boxes. Each hot box contains one or more stacks or columns of fuel cells 106A (generally referred to as "segments"), such as one or more stacks or columns of solid oxide fuel cells having a ceramic oxide electrolyte separated by conductive interconnect plates. Other fuel cell types, such as PEM, molten carbonate, phosphoric acid, etc., may also be used.

Fuel cells are often combined into units called "stacks" in which the fuel cells are electrically connected in series and separated by electrically conductive interconnects, such as gas separator plates which function as interconnects. A fuel cell stack may contain conductive end plates on its ends. A generalization of a fuel cell stack is the so-called fuel cell segment or column, which can contain one or more fuel cell stacks connected in series (e.g., where the end plate of one stack is connected electrically to an end plate of the next stack). A fuel cell segment or column may contain electrical leads which output the direct current from the segment or column to a power conditioning system. A fuel cell system can include one or more fuel cell columns, each of which may contain one or more fuel cell stacks, such as solid oxide fuel cell stacks.

The fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

Power modules may also comprise other generators of direct current, such as solar cell, wind turbine, geothermal or hydroelectric power generators.

The segment(s) 106A of fuel cells may be connected to one or more the DC buses 112 such as a split DC bus, by one or more DC/DC converters 106B located in module 106. The DC/DC converters 106B may be located anywhere in the fuel cell system, for example in the IOM 104 instead of the power modules 106.

The system may also optionally include an energy storage module 108 including a storage device, such as a bank of supercapacitors, batteries, flywheel, etc. The storage device may also be connected to the DC bus 112 using one or more DC/DC converters as shown in FIG. 1. Alternatively, the storage devices may be located in the power module 106 and/or together with the IT load 102.

FIGS. 2 and 5 illustrate an exemplary prior art modular fuel cell system described U.S. Provisional Patent Application Ser. No. 61/386,257, filed Sep. 24, 2010, and entitled "Fuel Cell Mechanical Components", and U.S. Non-Provisional Patent application Ser. No. 13/242,194, filed Sep. 23, 2011, entitled "Fuel Cell Mechanical Components", both of which are incorporated herein by reference in their entirety.

The modular system may contain modules and components described above as well as in U.S. patent application Ser. No. 11/656,006, filed on Jan. 22, 2007, and entitled "Modular Fuel Cell System" which is incorporated herein by reference in its entirety. The modular design of the fuel cell system enclosure 10 provides flexible system installation and operation. Modules allow scaling of installed generating capacity, reliable generation of power, flexibility of fuel processing, and flexibility of power output voltages and frequencies with a single design set. The modular design results in an "always on" unit with very high availability and reliability. This design also provides an easy means of scale up and meets specific requirements of customer's installations. The modular design also allows the use of available fuels and required voltages and frequencies which may vary by customer and/or by geographic region.

The modular fuel cell system enclosure 10 includes a plurality of power module housings 12 (containing a fuel cell power module components 70, where the housing 12 and its components 70 are jointly labeled 106 in FIGS. 1-6), one or more fuel input (i.e., fuel processing) module housings 16, and one or more power conditioning (i.e., electrical output) module housings 18 (where the housing and its contents are labeled 104 and referred to as "IOM" in FIGS. 1-6). For example, the system enclosure may include any desired number of modules, such as 2-30 power modules, for example 6-12 power modules. FIG. 2 illustrates a system enclosure 10 containing six power modules (one row of six modules stacked side to side), one fuel processing module, and one power conditioning module, on a common base 20. Each module may comprise its own cabinet or housing. Alternatively, as will be described in more detail below, the power conditioning (i.e., IOM) and fuel processing modules may be combined into a single input/output module located in one cabinet or housing 14. For brevity, each housing 12, 14, 16, 18 will be referred to as "module" below.

While one row of power modules 12 is shown, the system may comprise more than one row of modules 12. For example, the system may comprise two rows of power modules stacked back to back.

Each power module 12 is configured to house one or more hot boxes 13. Each hot box contains one or more stacks or columns of fuel cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. may also be used.

Fuel cells are often combined into units called "stacks" in which the fuel cells are electrically connected in series and separated by electrically conductive interconnects, such as gas separator plates which function as interconnects. A fuel cell stack may contain conductive end plates on its ends. A generalization of a fuel cell stack is the so-called fuel cell segment or column, which can contain one or more fuel cell stacks connected in series (e.g., where the end plate of one stack is connected electrically to an end plate of the next stack). A fuel cell segment or column may contain electrical leads which output the direct current from the segment or column to a power conditioning system. A fuel cell system can include one or more fuel cell columns, each of which may contain one or more fuel cell stacks, such as solid oxide fuel cell stacks.

The fuel cell stacks may comprise externally and/or internally manifolded stacks. For example, the stacks may be internally manifolded for fuel and air with fuel and air risers extending through openings in the fuel cell layers and/or in the interconnect plates between the fuel cells.

Alternatively, the fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

The modular fuel cell system enclosure 10 also contains one or more input or fuel processing modules 16. This module 16 includes a cabinet which contains the components used for pre-processing of fuel, such as desulfurizer beds. The fuel processing modules 16 may be designed to process different types of fuel. For example, a diesel fuel processing module, a natural gas fuel processing module, and an ethanol fuel processing module may be provided in the same or in separate cabinets. A different bed composition tailored for a particular fuel may be provided in each module. The processing module(s) 16 may processes at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels. If desired, a reformer 17 may be located in the fuel processing module 16. Alternatively, if it is desirable to thermally integrate the reformer 17 with the fuel cell stack(s), then a separate reformer 17 may be located in each hot box 13 in a respective power module 12. Furthermore, if internally reforming fuel cells are used, then an external reformer 17 may be omitted entirely.

The modular fuel cell system enclosure 10 also contains one or more power conditioning modules 18. The power conditioning module 18 includes a cabinet which contains the components for converting the fuel cell stack generated DC power to AC power (e.g., DC/DC and DC/AC converters described in U.S. Pat. No. 7,705,490, incorporated herein by reference in its entirety), electrical connectors for AC power output to the grid, circuits for managing electrical transients, a system controller (e.g., a computer or dedicated control logic device or circuit). The power conditioning module 18 may be designed to convert DC power from the fuel cell modules to different AC voltages and frequencies. Designs for 208V, 60 Hz; 480V, 60 Hz; 415V, 50 Hz and other common voltages and frequencies may be provided.

The fuel processing module 16 and the power conditioning module 18 may be housed in one input/output cabinet 14. If a single input/output cabinet 14 is provided, then modules 16 and 18 may be located vertically (e.g., power conditioning module 18 components above the fuel processing module 16 desulfurizer canisters / beds) or side by side in the cabinet 14.

As shown in one exemplary embodiment in FIG. 2, one input/output cabinet 14 is provided for one row of six power modules 12, which are arranged linearly side to side on one side of the input/output module 14. The row of modules may be positioned, for example, adjacent to a building for which the system provides power (e.g., with the backs of the cabinets of the modules facing the building wall). While one row of power modules 12 is shown, the system may comprise more than one row of modules 12. For example, as noted above, the system may comprise two rows of power modules stacked back to back.

The linear array of power modules 12 is readily scaled. For example, more or fewer power modules 12 may be provided depending on the power needs of the building or other facility serviced by the fuel cell system 10. The power modules 12 and input/output modules 14 may also be provided in other ratios. For example, in other exemplary embodiments, more or fewer power modules 12 may be provided adjacent to the input/output module 14. Further, the support functions could be served by more than one input/output module 14 (e.g., with a separate fuel processing module 16 and power conditioning module 18 cabinets). Additionally, while in one embodiment, the input/output module 14 is at the end of the row of power modules 12, it could also be located in the center of a row power modules 12.

The modular fuel cell system enclosure 10 may be configured in a way to ease servicing of the system. All of the routinely or high serviced components (such as the consumable components) may be placed in a single module to reduce amount of time required for the service person. For example, the purge gas and desulfurizer material for a natural gas fueled system may be placed in a single module (e.g., a fuel processing module 16 or a combined input/output module 14 cabinet). This would be the only module cabinet accessed during routine maintenance. Thus, each module 12, 14, 16, and 18 may be serviced, repaired or removed from the system without opening the other module cabinets and without servicing, repairing or removing the other modules.

For example, as described above, the enclosure 10 can include multiple power modules 12. When at least one power module 12 is taken off line (i.e., no power is generated by the stacks in the hot box 13 in the off line module 12), the remaining power modules 12, the fuel processing module 16 and the power conditioning module 18 (or the combined input/output module 14) are not taken off line. Furthermore, the fuel cell enclosure 10 may contain more than one of each type of module 12, 14, 16, or 18. When at least one module of a particular type is taken off line, the remaining modules of the same type are not taken off line.

Thus, in a system comprising a plurality of modules, each of the modules 12, 14, 16, or 18 may be electrically disconnected, removed from the fuel cell enclosure 10 and/or serviced or repaired without stopping an operation of the other modules in the system, allowing the fuel cell system to continue to generate electricity. The entire fuel cell system does not have to be shut down if one stack of fuel cells in one hot box 13 malfunctions or is taken off line for servicing.

Each of the power modules 12 and input/output modules 14 include a door 30 (e.g., hatch, access panel, etc.) to allow the internal components of the module to be accessed (e.g., for maintenance, repair, replacement, etc.). According to one embodiment, the modules 12 and 14 are arranged in a linear array that has doors 30 only on one face of each cabinet, allowing a continuous row of systems to be installed abutted against each other at the ends. In this way, the size and capacity of the fuel cell enclosure 10 can be adjusted with additional modules 12 or 14 and bases 20 with minimal rearranging needed for existing modules 12 and 14 and bases 20. If desired, the door to module 14 may be on the side rather than on the front of the cabinet.

As shown in FIG. 3, the door 30 may open in tandem with a substantially vertical and then substantially horizontal swing (e.g., "gull-wing" style). In other words, the door 30 opens by being moved up and then at least partially over the top of the enclosure 10 in a substantially horizontal direction. The terms substantially vertical and substantially horizontal of this embodiment include a deviation of 0 to 30 degrees, such as 0 to 10 degrees from exact vertical and horizontal directions, respectively.

The door 30 is mounted on to walls of the enclosure or cabinet 10 of the module 12 or 14 with plural independent mechanical arms, such as two arms 50 and two arms 54. FIG. 3 shows one arm 50 and one arm 54 on the right side of the cabinet 10. The corresponding arms 50 and 54 on the left side of the cabinet 10 are obscured by the right side arms and thus not visible in the side view of FIG. 3. Thus, two arms 50 and 54 are provided on either side of the door 30 for a total of four arms. The first arm 50 includes a first, generally straight end 51 and a second, generally curved end 52. The second arm 54 includes a first, generally curved end 55 and a second, generally straight end 56. The second arm 54 is longer than the first arm and has a more pronounced curvature at one end. The ends 51 and 55 are coupled to the interior surface of a wall of the enclosure 10 at a fixed distance relative to each other. The ends 52 and 56 are coupled to the door 30 at a fixed distance relative to each other. End 51 is located closer to the door than end 55. End 52 is located above end 56 on the door.

In the open position shown in FIG. 3, the upper portion of the door 30 may be located over the enclosure or cabinet 10 and the lower portion of the door may optionally overhang the opening to the enclosure 10. In this configuration, the door 30 provides rain and snow protection for a user when open since the lower portion of the door overhangs from the fuel cell system enclosure 10. Alternatively, the entire door 30 may be located over the enclosure 10 in the open position.

As shown in FIG. 4, field replaceable power module components (PMC) 70 include the hot box sub-system 13, such as the cylindrical hot box 13 that is shown in FIG. 2. The hot box 13 contains the fuel cell stacks and heat exchanger assembly. The PMC 70 also includes a frame 71 supporting the balance of plant (BOP) sub-system including blowers, valves, and control boards, etc (not shown for clarity) and a removable support 72, such as fork-lift rails, which supports the hot box and the frame. The support 72 allows the PMC 70 to be removed from the power module 12 cabinet as a single unit or assembly. Other configurations may also be used. For example, the hot box 13 may have a shape other than cylindrical, such as polygonal, etc. The support 72 may comprise a platform rather than rails. The frame may have a different configuration or it may be omitted entirely with the BOP components mounted onto the hotbox 13 and/or the support 72 instead. The PMC 70 is dimensionally smaller than the opening in the power module 12 (e.g., the opening closed by the door 30).

SUMMARY

A residential box data center system includes an information technology (IT) load, a direct current (DC) power generator electrically connected to the IT load, and a housing. Both the IT load and the DC power generator are located in the housing.

DESCRIPTION OF THE DRAWINGS

FIG. 1 is a block diagram illustrating a prior art system.

FIG. 2 is an isometric view of a prior art modular fuel cell system enclosure that can be used with the exemplary embodiments.

FIG. 3 is a side view of an open door of the prior art system of FIG. 2.

FIG. 4 is an isometric view of a hot box of the prior art modular fuel cell system of FIG. 2.

FIG. 5 is photograph of the housing of the prior art modular fuel cell system of FIG. 2.

FIG. 7 is a side cross sectional view of a box data center.

DETAILED DESCRIPTION

Figure 6A:
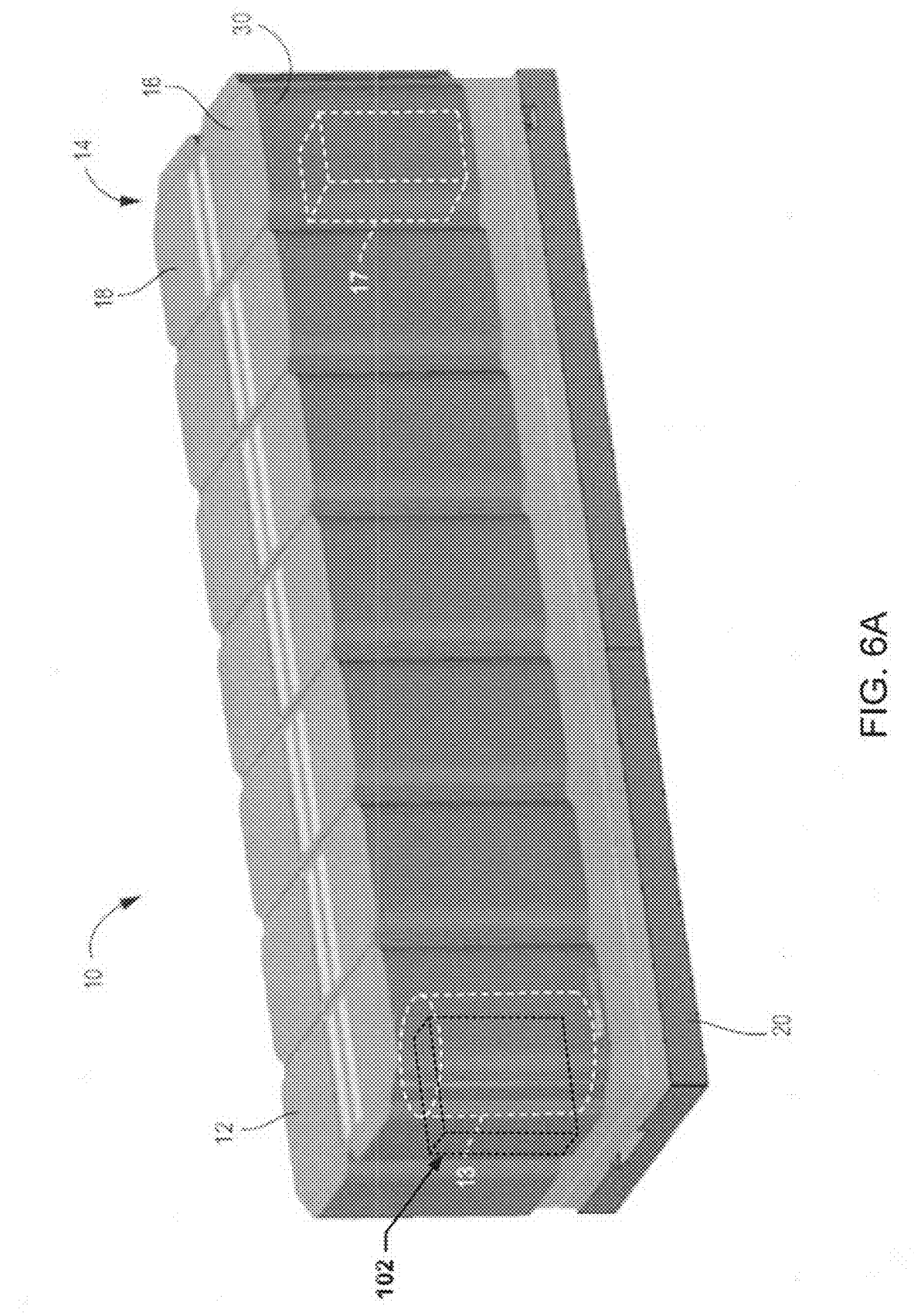
FIGS. 6A-6D are isometric views of embodiment box data centers.
Figure 6B:
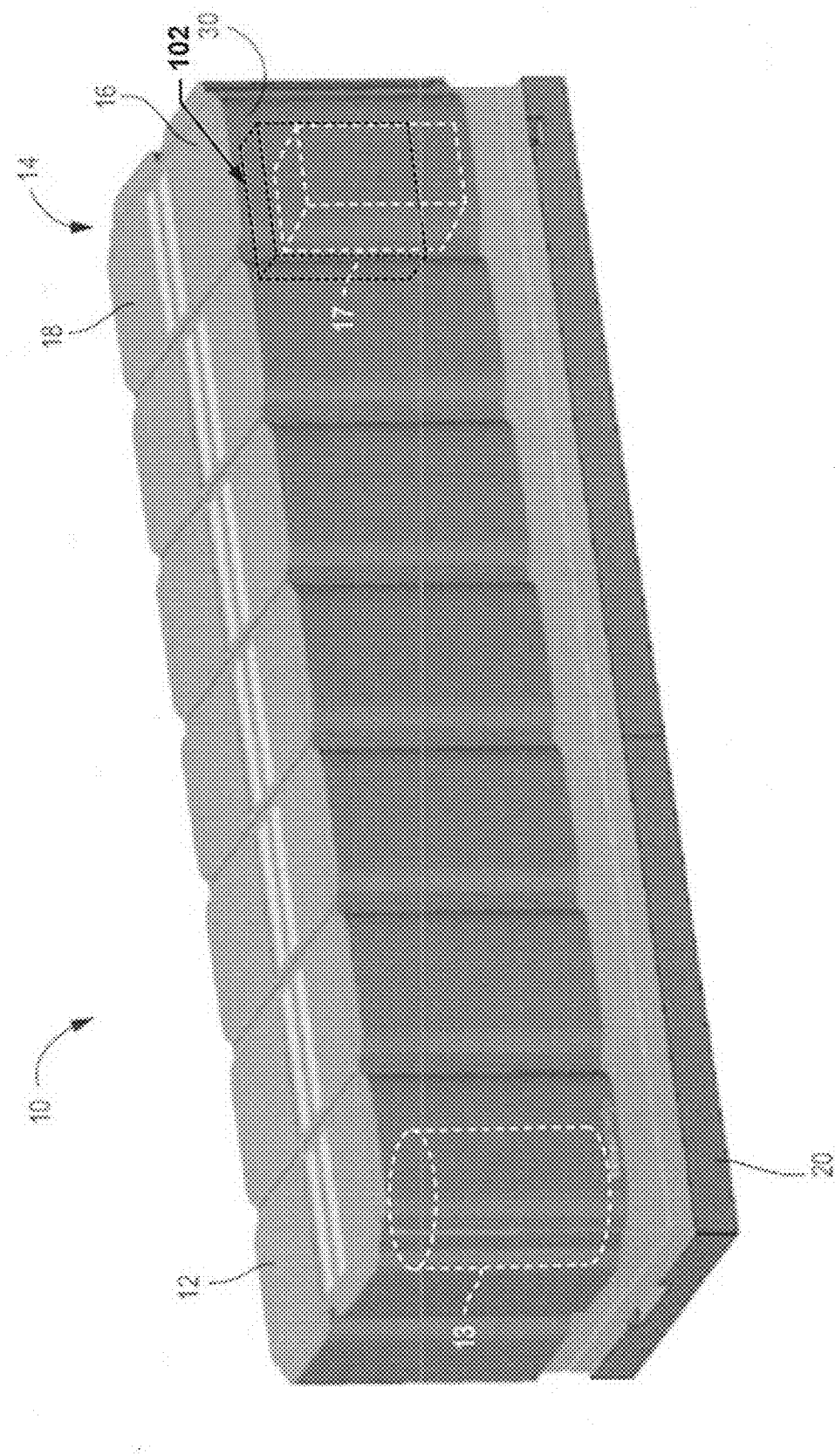
Figure 6C:
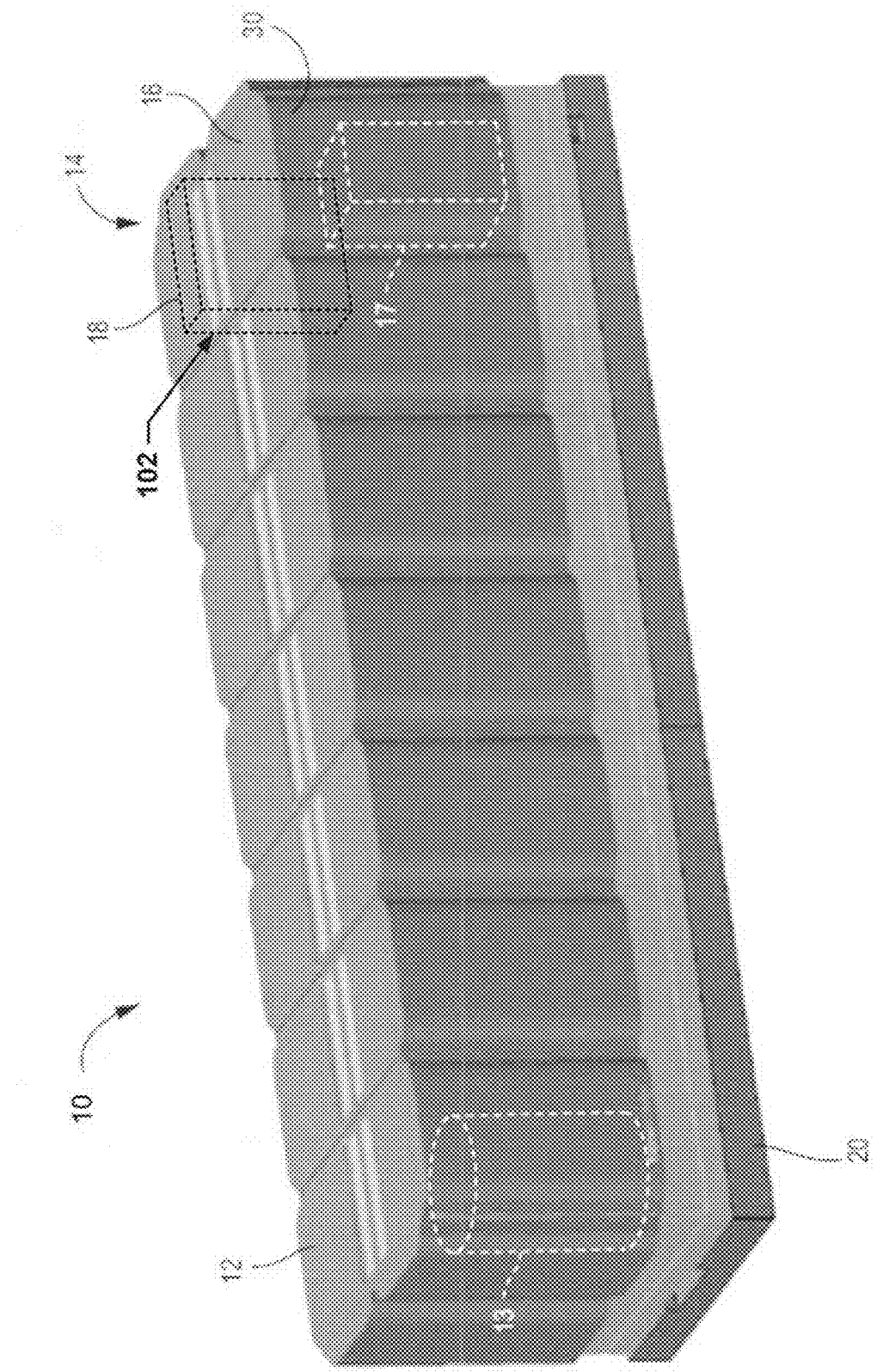

FIGS. 6A-6D and 7 illustrate embodiments of the invention. In the embodiments of the invention, the IT load 102 is located in the same housing (e.g., enclosure or cabinet) 10 (similar to housing 10 described above with reference to FIGS. 2-5) as the fuel cell hot box 13. In an embodiment illustrated in FIG. 6A, the IT load 102, such as a rack of computer servers, data storage, network (e.g., routers), etc. and its associated power supply 102A are located in the same power module 12 housing (e.g., cabinet) as the power module components (PMC) 70 (e.g., the hot box 13 and frame 71 supporting BOP components). Alternatively, the IT load 102 may be located in the power conditioning module 18 housing (e.g., cabinet) as illustrated in FIG. 6C or in the common input/output module housing 14 together with the IOM components (e.g., inverter 104A) and/or fuel processing module 16 components (e.g., desulfurizer beds) as illustrated in FIG. 6B.

The housing 10 with the fuel cell hot box 13 and IT load 102 is described below as a "Box Data Center" (abbreviated as "BDC") for brevity. While a fuel cell is described herein as the power source for the IT load 102, any other DC power source, such as a microturbine, solar power hardware, etc. may be used instead of, or in addition to, the fuel cells. Thus, the IT load 102, such as DC IT load, is integrated into the same housing 10 as its DC power generator.

As described herein, an IT load (i.e., devices operating in an IT system which may include one or more of computer(s), server(s), router(s), rack(s), power supply connections, and other components found in a data center environment) and IT system are distinguished from devices, such as computers, servers, routers, racks, controllers, power supply connections, and other components used to monitor, manage, and/or control the operation of DC power generators and DC power generation systems in that IT loads do not monitor, manage, and/or control the operation of any DC power generators or DC power generation systems that provide power to the IT loads themselves.

Main sources of energy are typically separated from IT loads (i.e., devices operating in an IT system which may include one or more of computer(s), server(s), router(s), rack(s), power supply connections, and other components found in a data center environment such as telephone company/cable company/Internet provider company central offices). IT loads generally will require an environment that provides power and an extensive HVAC (Heating, Ventilation and Air Conditioning) system to meet IT load cooling requirements. Classically, IT loads utilize electric utility connections and generators as power sources, UPS (Uninterruptible Power Supplies) system for power conditioning, and several stages of transformations (e.g., substation to power distribution units to remote power panels) from MV (Medium Voltage) level down to LV (Low Voltage) level, AC or DC, for matching the IT load power requirements. Data center environments, such as telephone company/cable company/Internet provider company central offices, generally utilize an array of HVAC components, including chillers, CRACs (Computer Room Air Conditioners), pumps, and heavy piping to cool the IT loads in the data center environments. Previous containerized power solutions may have concentrated some of the functions of power generation operations and IT load operations, and even eliminated some operations, but previous containerized power solutions have generally distributed power generation and IT load operations in several separate containers.

Figure 6D:
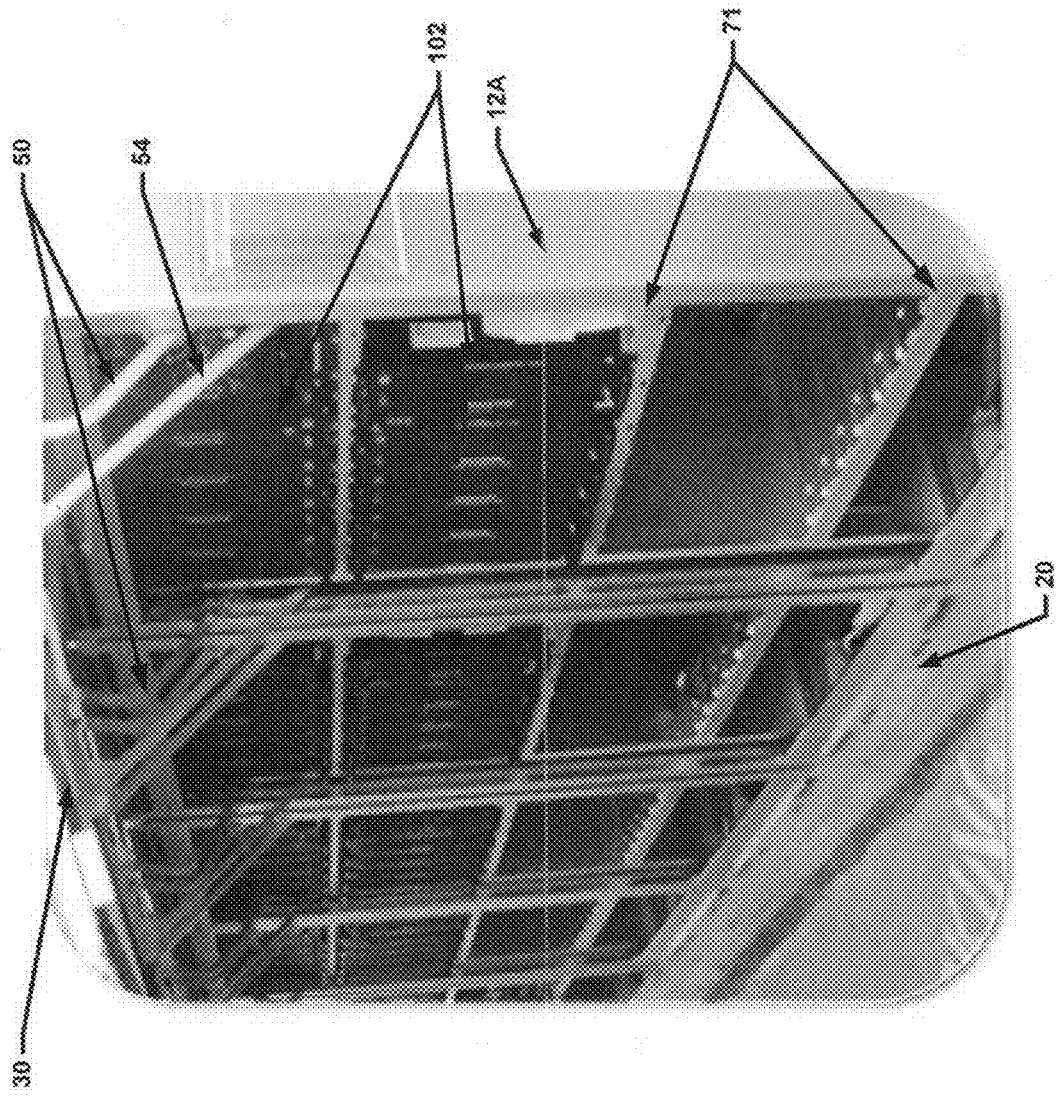

The embodiments of this invention concentrate all the above functions under one apparatus that generates and conditions power while cooling and operating IT loads, such as rack mounted IT infrastructure devices. The apparatus is preferably the BDC described above. FIG. 6D illustrates an embodiment BDC in which the power module 12 housing 12A includes multiple racks of IT loads 102. The door 30 is illustrated in the open position supported by arms 50 and 54. The racks of IT loads 102 are supported by the frame 71 and the combined power module housing 12A and IT loads 102 are supported on common base 20. FIG. 7 illustrates another embodiment BDC in which 6 power module housings 12A, 12B, 12C, 12D, 12E, and 12F each including IT loads 102 are arranged on a common base 20 such that passages 702 are created between rows of power module housings. The doors 30 are illustrated in an open position, and the passages 702 may facilitate access to the power module housings 12A, 12B, 12C, 12D, 12E, and 12F during maintenance. Frames 71 support IT loads 102, and in an embodiment, the IT loads 102 may be coupled to the fuel cell hot boxes 13 via electrical connections in the frames 71.

While the apparatus is preferably the BDC, other power generators may be used. Thus, the embodiments of the invention relate generally to alternative energy or green devices operating in close coupling with IT loads creating an integrated and complete data center function.

The BDC described above responds to the powering requirements of the market by being able to scale from tens of KWs to MWs in the most straightforward way. The BDC utilizes the SOFC (Solid Oxide Fuel Cell) technology, as described with respect to FIGS. 1-5 above, to provide a scalable power generation and IT load integrated data center for use in a residential setting.

The present embodiments of the invention enable total integration of IT loads in the BDC housing. This creates a new building block for the IT world, enabling utilization of a simple row of modules 12, 14, 18, etc. shown in FIGS. 6A-6C to scale IT needs from single racks, to multiple rows, to mega-scale data centers while totally controlling not only complexity and sprawl, but also cost with rigorous standardization.

Figure 8:
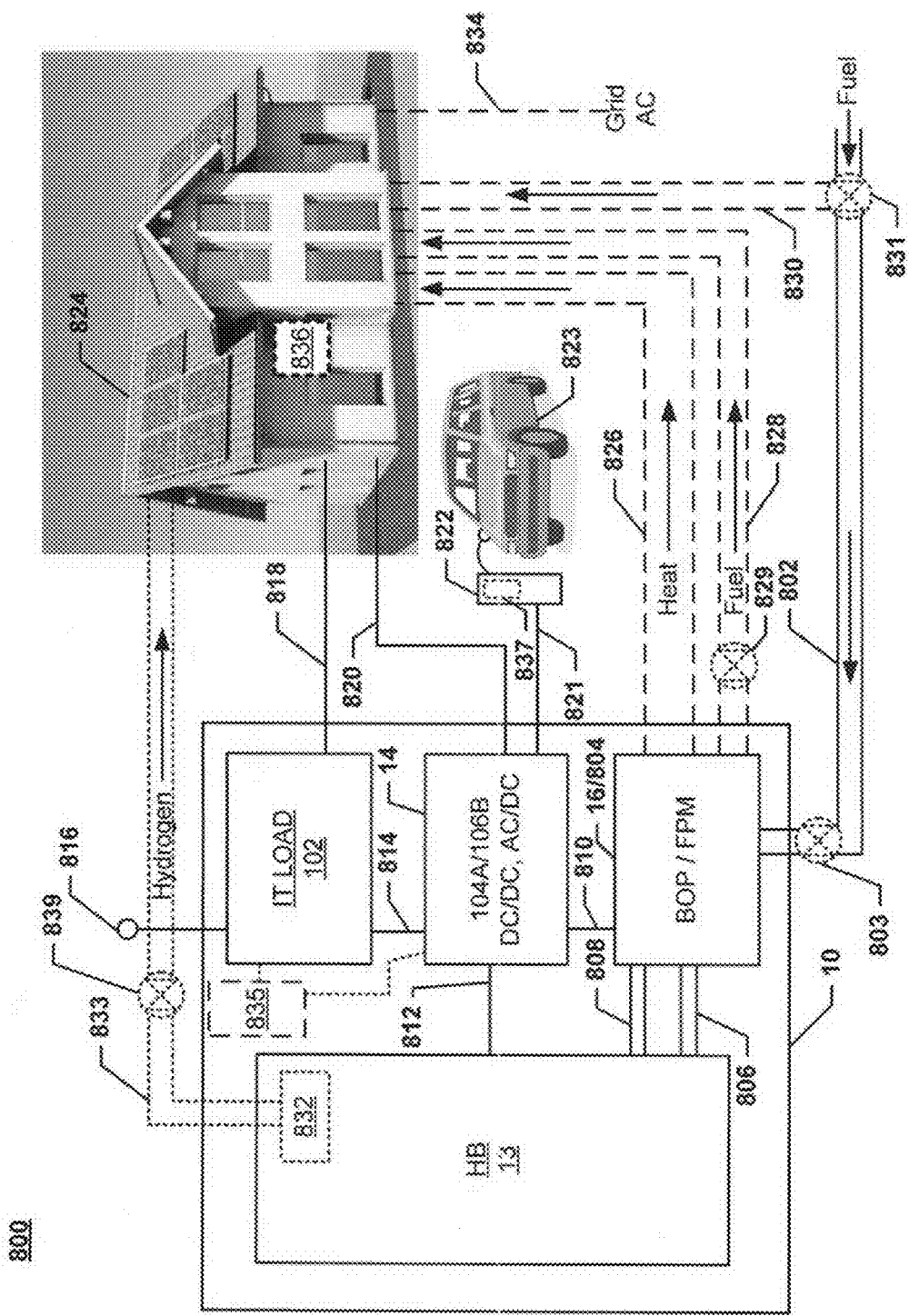
FIGS. 8-9 are schematic diagrams of embodiment box data center systems according to embodiments of the invention.

FIG. 8 illustrates a box data center system 800 according to an embodiment. In box data center system 800, an individual BDC 10 is provided for each residential unit (e.g., a house or apartment building) 824. In an embodiment, the BDC 10 may include modules 12, 14, 16 and/or 18 described above. These modules may include a power module 12 containing PMC 70 (e.g., frame 71, balance of plant (BOP) devices 804 and a hot box 13), an input/output module 14, an optional fuel processing module (FMP) 16 and one or more IT loads 102 located in one or more module housings. The module housings described above with respect to FIGS. 2-7 are omitted from the FIG. 8 schematic illustration for clarity.

The BDC 10 may convert fuel (e.g., natural gas) supplied by a fuel pipeline (e.g., a natural gas utility line) 802 to electricity to meet the needs of the residential unit 824. In an embodiment, the fuel pipeline 802 may be coupled to the BDC 10 and provide fuel to the fuel processing module 16 and the balance of plant (BOP) devices (such as fuel blowers, valves, etc.) 804. In an optional embodiment, the flow of fuel to the BDC 10 may be controlled by an optional valve 803, which may be any type valve, such as a remotely operated valve, manually operated valve, computer controlled valve, etc. The BOP devices 804 may provided fuel to the hot box 13 containing the fuel cell(s) via fuel inlet conduit 806. The fuel cell(s) in the hot box 13 may use the fuel to produce DC electricity as discussed above, and the DC electricity may be provide from the fuel cell(s) of the hot box 13 to an input/output module 14 housing various power electronics devices, such as DC/DC converters 106B and/or DC/AC inverter 104A, via an electrical connection (e.g., bus(es)) 812. Process exhaust (e.g., Anode Tail Gas Oxidizer (ATO) exhaust) from the hot box 13 may be output from the hot box 13 to the BOP devices 804 via an exhaust conduit 808 coupled between the hot box 13 and the BOP devices 804. In an embodiment, DC electricity from the input/output module 14 may be provided to the BOP devices 804 by electrical connection (e.g., bus (es)) 810 and may be used to power the BOP devices 804. Additionally, DC electricity from the input/output module 14 may be provided to the IT load 102 via electrical connection (e.g., bus(es)) 814 and may be used to power the IT load 102.

In an embodiment, power electronic devices, such as DC/AC inverter 104A, of the input/output module 14 may convert the DC electricity received from the fuel cell(s) of the hot box 13 to AC electricity (e.g., 110 VAC, 120 VAC, 220 VAC, 240 VAC, etc.). An electrical connection 820 electrically connecting the BDC 10 and the residential unit 824 may provide electricity from the input/output module 14 to the residential unit 824. In this manner, electricity generated by the BDC 10 may be used to power devices of the residential unit 824. Additionally, power electronic devices, such as DC/DC converter 106B, of the input/output module 14 may boost and/or buck the DC electricity provided from the fuel cell(s) of the hot box 13 to provide DC electricity (e.g., +/−400 VDC, +/−380 VDC, +/−48 VDC, etc.) for electric vehicle 823 charging and/or the residential unit 824. An electrical connection 821 electrically connecting the BDC 10 and an electric vehicle charging station 822 may provide electricity from the input/output module 14 to the electric vehicle charging station 822. One or more electric vehicles 823, such as an electric vehicle 823 owned by a resident of the residential unit, may be connected to the electric vehicle charging station 822. In this manner, electricity generated by the BDC 10 may be used to charge electric vehicle 823. In an embodiment, combinations of both AC and DC power, all AC power, and/or all DC power may be provided from the BDC 10 to the residential unit 824. The ratio of AC power to DC power may be dynamic based on the real-time needs of the residential unit 824 and/or real-time capacity of the BDC 10. As examples, only AC power may be provided to the residential unit 824, only DC power may be provided to the residential unit 824, 25% AC power and 75% DC power, 25% DC power and 75% AC power, 50% AC power and 50% DC power, and/or any other combination of ratios of AC power to DC power as a percentage of total power provided from the BDC 10 to the residential unit 824 may be realized.

In an embodiment, the one or more IT loads 102 may be various devices such as computer(s), server(s), router(s), modem(s), rack(s), etc., that operate to provide IT services to both the residential unit 824 and/or utility operators (e.g., natural gas utility, cable companies, water utilities, electrical utilities, wired and/or cellular phone companies, Internet providers, etc.). The IT loads 102 may be connected to the residential unit 824 by one or more data connections (e.g., wired Ethernet connections, wireless Wi-Fi connections, etc.) 818. In an embodiment, the one or more data connections 818 may connect meters (such as electric and/or natural gas meters) in the residential unit 824 to the IT loads 102, such that meter data may be received from the meters at the IT loads 102 and/or control signals from the IT loads 102 may control the operation of the meters and/or utility supplies (e.g., electric and/or natural gas) to the residential unit 824. The IT loads 102 may also be connected to the utility operators via one or more connections (e.g., wired and/or wireless connections) 816 to various communications networks (e.g., the public switched telephone network, cable networks, cellular networks, Internet, etc.). In this manner, data (e.g., meter data for usage and/or billing and/or control signals to optimize utility usage) may be exchanged between the IT loads 102 and the residential unit 824, between the IT loads 102 and the utility operators, and/or between the residential unit 824 and the utility operators via the IT loads 102. As examples, telecommunications services may be provided to the residential unit 824 via the IT loads 102, video communications, such as television, may be provided to the residential unit 824 via the IT loads 102, and/or Internet service may be provide to the residential unit 824 via the IT loads 102. As additional examples, smart grid connections between the residential unit 824 and the utility operators may be provided by the data connections 818 and connections 816, enabling grid coordination with both residential unit 824 systems and utility grid operators. In this manner, the BDC may serve as a data center node for a smart grid and may provide a grid sensor management infrastructure for management of the smart grid. The distribution of the BDC 10 and the monitoring and/or control of the residential unit 824 devices by the IT loads 102 may enable the BDC 10 to become a "smart agent" asset reporting to sub-stations throughout the grid and managing the smart grid. In an embodiment, the movement of IT devices such as routers and/or modems to the BDC 10 rather than the residential unit 824, may enable a plug-and-play functionality for the residential unit in which devices may be directly connected to the data connections 818.

In an optional embodiment, in addition to electricity provided via electrical connection 820, the residential unit 824 may also be connected to an AC power grid, such as by a optional grid connection 834. In this manner, the residential unit 824 may receive power both from the BDC and/or the utility power grid. In an embodiment, the devices of the residential unit 824 may report their power consumption from the utility power grid to the IT loads 102 via the data connection 818. In a further embodiment, the IT loads 102 may be configured to control the power consumption of the devices of the residential unit 824 via the data connection 818 and/or report the power consumption information to the utility power grid operator via connection 816. In this manner, the BDC 10 may serve as a "smart agent" for the utility power grid.

In an optional embodiment, the BDC 10 may provide fuel (e.g., natural gas) to the residential unit 824 via an optional fuel conduit 828. In an embodiment, the optional fuel conduit 828 may be coupled between the BOP devices 804 and the residential unit 824. An optional valve 829, which may be any type valve, such as a remotely operated valve, manually operated valve, computer controlled valve, etc., may control the flow of fuel from the BDC 10 to the residential unit 824. The provisioning of fuel from the BDC 10 to the residential unit 824 may enable the BDC 10 to monitor and/or control the flow of fuel to the residential unit 824. In an additional optional embodiment, the BDC 10 may include analysis equipment to monitor the quality and composition of the fuel (e.g., natural gas) provided to the residential unit 824. The BDC 10 may be configured with logic to pass the quality and composition information on to the residential unit 824. In an alternative optional embodiment, the residential unit may be directly connected to the fuel pipeline 802 via an optional fuel inlet conduit 830. An optional valve 831, which may be any type valve, such as a remotely operated valve, manually operated valve, computer controlled valve, etc., may control the flow of fuel from the fuel pipeline 802 to the residential unit 824, the fuel processing module 16 and the BOP components 804.

In another optional embodiment, the BDC 10 may provide heat, such as heat from the process exhaust of the hot box 13 and/or heat from the BOP devices 804, to the residential unit 824 via a heat conduit 826 coupled between the BOP devices 804 and the residential unit 824. The heat conduit 826 may be any type connection configured to transfer heat energy from the BDC 10 to the residential unit, such as a hot air duct, hot water loop, heat sink, process exhaust loop, etc. In this manner, the BDC 10 may heat the residential unit 824.

In another optional embodiment, the BDC 10 may provide hydrogen to the residential unit 824. In an embodiment, the hot box 13 of the BDC 10 may include an optional hydrogen separator 832 which may separate hydrogen from fuel exhaust of the fuel cell(s) within the hot box 13. The hydrogen separator 832 may be coupled to an optional hydrogen conduit 833 which may be coupled to the residential unit 824 and may provide hydrogen from the hydrogen separator 832 to the residential unit 824. An optional valve 839 which may be any type valve, such as a remotely operated valve, manually operated valve, computer controlled valve, etc., may control the flow of hydrogen from the BDC to the residential unit 824.

In another optional embodiment, the BDC 10 may include an optional remote console 835 which may be a controller (e.g., a computer) including a user input/output device (e.g., a touch screen display). In an embodiment the remote console 835 may be coupled to the IT loads 102 and/or the input/output module 14, as well as to other devices, such as the BOP devices 804, and/or valves 831, 803, 829, and 839. The remote console 835 may control the operations of the BDC 10 related to providing fuel, hydrogen, heat, electricity, and/or data connections to the residential unit 824 and/or electric vehicle charging station 822. In an embodiment, the remote console 835 may operate as a vehicle to grid interface for the vehicle charging station 822. In an alternative optional embodiment, the vehicle charging station 822 may include its own vehicle to grid interface 837, separate from the remote console 835. Additionally, in another optional embodiment, the residential unit 824 may include its own remote console 836 to control the various fuel, hydrogen, heat, electricity, and/or data connections in addition to, or in place of, the remote console 835 located in the BDC 10. The remote console 836 located in the residential unit 824 may be in electrical and/or data communication with the IT loads 102 of the BDC 10, such as via the data connection 818, electrical connection 820, and/or other wired/wireless connections, and may control, configure, and/or bill all functions of BDC 10.

Figure 9:
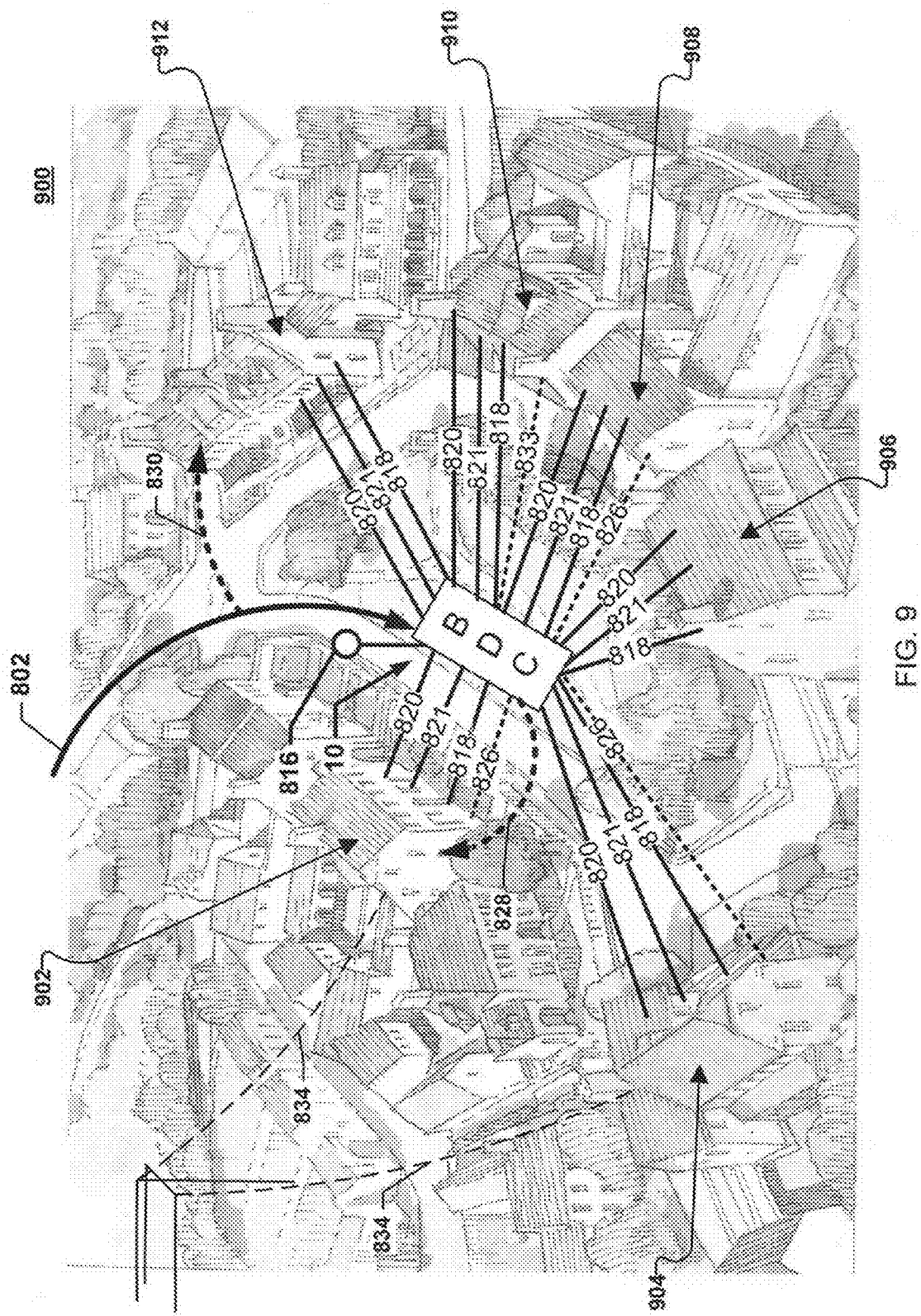

FIG. 9 illustrates a box data center system 900 according to an embodiment. The box data center system 900 is similar to BDC system 800 described above with reference to FIG. 8, except that one or more BDCs 10 may provide fuel, hydrogen, heat, electricity, and/or data connections to multiple residential units 902, 904, 906, 908, 910, and 912 located in a residential neighborhood, rather than just one residential unit 824. Those components which are common to both box data center systems 800 and 900 are numbered with the same numbers in FIGS. 8 and 9 and will not be described further.

In an embodiment, the BDC 10 may be located in a central area of the neighborhood, such as a park and/or street corner. Alternatively, the BDC 10 may be located anywhere in the neighborhood, such as adjacent to one residential unit 902. Various connections between the residential units 902, 904, 906, 908, 910, and 912 and the BDC 10 may be established in a manner similar to that described above with reference to residential unit 824. In an embodiment, all or a portion of the connections 820, 821, 818, 826, and/or 828 between the BDC 10 and the residential unit 824 described above, may be established between the BDC 10 and residential units 902, 904, 906, 908, 910, and 912, respectively, and each residential unit 902, 904, 906, 908, 910, and 912 may or may not include the same connections to the BDC 10. As examples: the residential unit 902 may include an AC power connection 820 to the BDC 10, a DC power connection 821, such as for an electric vehicle charging station 822, to the BDC 10, a data connection 818 to the BDC 10, an optional heat connection 826 to the BDC 10, and an optional fuel connection 828 to the BDC 10; the residential units 904 and 908 may each include an AC power connection 820 to the BDC 10, a DC power connection 821, such as for an electric vehicle charging station 822, to the BDC 10, a data connection 818 to the BDC 10, and an optional heat connection 826 to the BDC 10; the residential units 906 and 912 may each include an AC power connection 820 to the BDC 10, a DC power connection 821, such as for an electric vehicle charging station 822, to the BDC 10, and a data connection 818 to the BDC 10; and the residential unit 910 may include an AC power connection 820 to the BDC 10, a DC power connection 821, such as for an electric vehicle charging station 822, to the BDC 10, a data connection 818 to the BDC 10, and an optional hydrogen connection 833 to the BDC 10.

In an embodiment, one or more of the residential units 902, 904, 906, 908, 910, and/or 912 may include power utility grid connections 834 and/or fuel pipeline connections 830 as described above with reference to FIG. 8. For example, residential units 902 and 904 may include power utility grid connections 834 and residential unit 912 may include a fuel pipeline connection 830.

In an embodiment, each residential unit 902, 904, 906, 908, 910, and/or 912 may include its own remote console 836 as described above with reference to FIG. 8. In this manner, each residential unit 902, 904, 906, 908, 910, and/or 912 may be able to control, configure, and/or bill its own use of the BDC 10, which may decrease the cost of IT services and electrical generation for each individual residential unit 902, 904, 906, 908, 910, and/or 912.

In an embodiment, the IT loads 102 and data connections 818 of the box data center system 900 may provide IT services to the residential units 902, 904, 906, 908, 910, and/or 912 of the neighborhood. In an embodiment, the IT loads 102 may support telecom switching operations which may replace the switching functionality of a telecommunications utility central office. In this manner, the BDC 10 may distribute the functionality of a telecommunications utility central office, potentially increasing telecommunications network reliability and reducing cost.

In an embodiment, the IT loads 102, data connections 818 to the residential units 902, 904, 906, 908, 910, and/or 912, and connections 816 to the utilities (e.g., electric utilities and/or natural gas utilities) of the box data center system 900 may enable the BDC 10 to operate as a smart grid data node for the neighborhood. Smart grid nodes via BDC 10 may provide data feedback to the electric utility grid and/or fuel infrastructure grid. For example, the BDC 10 may identify pressure events in the natural gas supply, and safety responses may be triggered (e.g., closing of valves to isolate a neighborhood's natural gas supply if pressure collapses in a large region). The IT loads 102 of the BDC 10 may receive and pass along the pressure event signals to the utility and/or control the safety responses.

In a further embodiment, a BDC 10 may be integrated with other distributed generation assets such as solar and/or wind generators. In an embodiment in which the other distributed generation assets generate power in excess of the neighborhood needs and the fuel cell(s) in the hot box 13 is/are regenerative fuel cell(s), the excess power may be provided to BDC 10 and the fuel cell(s) may be run in reverse (i.e., electrolysis mode) to generate fuel. During times when the other distributed generation assets cannot generate sufficient power (e.g., during the night for solar generators), the fuel cell(s) may be run in power generation mode (i.e., fuel cell mode) to convert the previously generated fuel to electricity. In this manner, a BDC 10 and integrated other generation asset system may generate electricity continually without requiring additional fuel input.

In an embodiment, a BDC 10 may operate as a controller of the assets on a microgrid, such as a grid of BDCs 10 and/or other distributed generation assets (e.g., solar panels, wind turbines, diesel generators, etc). The IT loads 102 in at least one BDC 10 may operating a master-slave arrangement and coordinated commands for the other BDCs 10 and/or other distributed generation assets in the area (e.g., in the same neighborhood, campus, county, town, etc.).

The foregoing method descriptions and diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more diagrams have been used to describe exemplary embodiments. The use of diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements may be implemented using computing devices (such as computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use the described embodiment. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope consistent with the following claims and the principles and novel features disclosed herein.

What is claimed is:

1. A residential box data center system, comprising:
   an information technology (IT) load;
   a direct current (DC) power generator electrically connected to the IT load;
   a housing, wherein both the IT load and the DC power generator are located in the housing;
   an inverter electrically connected to the DC power generator and configured to provide alternating current (AC) power to a residential unit; and
   a data connection between the IT load and the residential unit;
   wherein the DC power generator comprises a fuel cell power generation system, and the IT load comprises at least one server, storage device, or network component.

2. The residential box data center system of claim 1, further comprising:
   an electric vehicle charging station electrically connected to the DC power generator, the electric vehicle charging station configured to charge an electric vehicle.

3. The residential box data center system of claim 2, further comprising:
   a heat connection between the DC power generator and the residential unit, the heat connection configured to provide heat from the fuel cell power generation system to the residential unit.

4. The residential box data center system of claim 2, further comprising:
   a hydrogen connection between the DC power generator and the residential unit, the hydrogen connection configured to provide hydrogen from the fuel cell power generation system to the residential unit.

5. The residential box data center system of claim 1, wherein the IT load provides IT services to the residential unit.

6. The residential box data center system of claim 5, wherein the IT services are one or more of telecommunications services, video communications services, or Internet service.

7. The residential box data center system of claim 1, wherein the IT load is connected to a utility grid operator.

8. The residential box data center system of claim 7, wherein the utility grid operator is one or more of an electric grid operator and natural gas grid operator.

9. The residential box data center system of claim 8, wherein the IT load functions as a smart grid node to perform one or more of the following operations: controlling grid usage by the residential unit, reporting residential unit grid usage information to the grid operator, controlling safety responses, and reporting residential billing information to the grid operator.

10. The residential box data center system of claim 1, wherein the residential unit comprises a plurality of residential units.

11. The residential box data center system of claim 1, wherein the fuel cell power generation system is a regenerative fuel cell power generation system, the residential box data center system further comprising:
   a distributed generator connected to the DC power generator and the residential unit, the distributed generator configured to provide power to the DC power generator and the residential unit, wherein:
   the DC power generator is configured to operate in electrolysis mode to generate fuel when the distributed generator is generating power in excess of the needs of the residential unit and operate in fuel cell mode when the distributed generator is generating power below the needs of the residential unit.

12. The residential box data center system of claim 11, wherein the distributed generator is one of a wind turbine system and a solar panel system.

13. A residential box data center system, comprising:
   an information technology (IT) load;
   a direct current (DC) power generator electrically connected to the IT load;
   a housing, wherein both the IT load and the DC power generator are located in the housing;
   a power electronics device electrically connected to the DC power generator and configured to provide DC power to a residential unit; and
   a data connection between the IT load and the residential unit;
   wherein the DC power generator comprises a fuel cell power generation system, and the IT load comprises at least one server, storage device, or network component.

14. A residential box data center system, comprising:
   an information technology (IT) load;
   a direct current (DC) power generator electrically connected to the IT load;
   a housing, wherein both the IT load and the DC power generator are located in the housing;
   one or more power electronics devices electrically connected to the DC power generator, the one or more power electronics devices configured to provide AC power and DC power to a residential unit; and
   a data connection between the IT load and the residential unit;
   wherein the DC power generator comprises a fuel cell power generation system, and the IT load comprises at least one server, storage device, or network component.

15. A method for operating a residential box data center system, comprising:
   providing a box data center comprising:
      an information technology (IT) load;
      a direct current (DC) power generator electrically connected to the IT load;
      and
      a housing, wherein both the IT load and the DC power generator are located in the housing; and
   operating the DC power generator to supply power to the IT load, wherein the box data center further comprises an inverter electrically connected to the DC power generator, the method further comprising:
   providing DC power from the DC power generator to the inverter;
   providing alternating current (AC) power from the inverter to a residential unit; and
   providing a data connection between the IT load and the residential unit;
   wherein the DC power generator comprises a fuel cell power generation system, and the IT load comprises at least one server, storage device, or network component.

16. The method of claim 15, further comprising providing DC power from the DC power generator to an electric vehicle charging station.

17. The method of claim 15, further comprising providing heat from the fuel cell power generation system to the residential unit.

18. The method of claim 15, further comprising providing hydrogen from the fuel cell power generation system to the residential unit.

19. The method of claim 15, further comprising providing IT services from the IT load to the residential unit.

20. The method of claim 19, wherein the IT services are one or more of telecommunications services, video communications services, or Internet service.

21. The method of claim 15, wherein the IT load exchanges information with a utility grid operator.

22. The method of claim 21, wherein the utility grid operator is one or more of an electric grid operator and natural gas grid operator.

23. The method of claim 22, further comprising operating the IT load as a smart grid node to perform one or more of the following: controlling grid usage by the residential unit, reporting residential unit grid usage information to the grid operator, controlling safety responses, and reporting residential billing information to the grid operator.

24. The method of claim 15, wherein the residential unit comprises a plurality of residential units.

25. The method of claim 15, wherein the fuel cell power generation system is a regenerative fuel cell power generation system, the method further comprising:
   providing a distributed generator connected to the DC power generator and the residential unit;
   operating the distributed generator to provide power to the DC power generator and the residential unit;
   operating the DC power generator in electrolysis mode to generate fuel when the distributed generator is generating power in excess of the needs of the residential unit; and
   operating the DC power generator in fuel cell mode when the distributed generator is generating power below the needs of the residential unit.

26. The method of claim 25, wherein the distributed generator is one of a wind turbine system and a solar panel system.

27. The method of claim 15, further comprising:
   providing DC power from the DC power generator to a residential unit; and
   providing a data connection between the IT load and the residential unit.

28. The method of claim 15, wherein the box data center further comprises an inverter electrically connected to the DC power generator, the method further comprising:
   providing DC power from the DC power generator to the inverter;
   providing alternating current (AC) power from the inverter to a residential unit;
   providing DC power from the DC power generator to the residential unit; and
   providing a data connection between the IT load and the residential unit.

* * * * *